United States Patent [19]

Nagashima

[11] Patent Number: 4,679,096
[45] Date of Patent: Jul. 7, 1987

[54] IMAGE PROCESSING APPARATUS
[75] Inventor: Nao Nagashima, Yokohama, Japan
[73] Assignee: Canon Kabushiki Kaisha, Tokyo, Japan
[21] Appl. No.: 590,753
[22] Filed: Mar. 19, 1984
[30] Foreign Application Priority Data Mar. 30, 1983 [JP] Japan ................................ 58-52743

[51] Int. Cl.⁴ .............................................. H04H 1/04
[52] U.S. Cl. .................................... 358/287; 358/298; 358/77; 382/59
[58] Field of Search ............... 358/287, 280, 283, 298, 358/77; 382/59

[56] References Cited

U.S. PATENT DOCUMENTS

| 4,163,605 | 8/1979 | Yamada | 358/287 |
| 4,233,636 | 11/1980 | Harbaugh et al. | 358/287 |
| 4,282,550 | 8/1981 | Coviello | 358/287 |
| 4,533,958 | 8/1985 | Herget | 358/280 |
| 4,561,024 | 12/1985 | Tamura | 358/287 |

FOREIGN PATENT DOCUMENTS 2134350 8/1984 United Kingdom .

Primary Examiner—Edward L. Coles, Sr.
Attorney, Agent, or Firm—Fitzpatrick, Cella, Harper & Scinto

[57] ABSTRACT

An image processing apparatus comprises an image reader for inputting image data, a memory for storing the image data, a read clock generator for generating a read clock to read out the image data from the memory and a write clock generator for generating a write clock to write the image data into the memory. The read clock generator and the write clock generator vary the frequencies of their respective clocks in accordance with a magnification/reduction factor.

27 Claims, 5 Drawing Figures

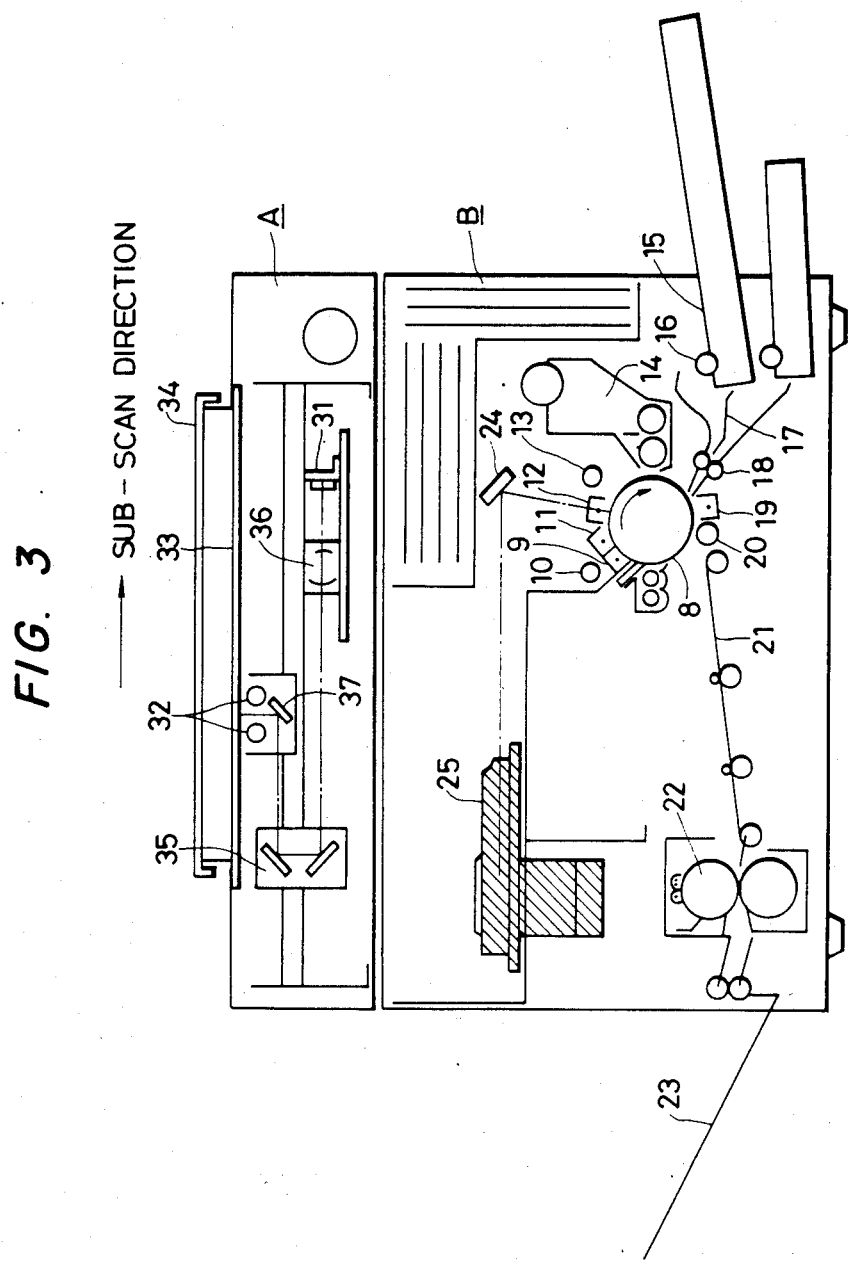

IMAGE PROCESSING APPARATUS

BACKGROUND OF THE INVENTION

1. Field of the Invention

The present invention relates to an image processing apparatus having a variable magnification/reduction function, and more particularly to a digital image processing apparatus such as a digital copying machine which can electrically magnify or reduce image data.

2. Description of the Prior Art

FIG. 1 shows a prior art image processing apparatus of the above type.

In FIG. 1, an image data is outputted from image reader 1 in synchronism with a frequency $f\omega$ and the image data is magnified or reduced by a factor of 0 to 2. A clock generator 2 generates a clock signal having the frequency $f\omega$ and a clock signal having a frequency $2f\omega$ which is used to magnify the image data by a factor of up to two.

The clock signal having the frequency $2f\omega$ is supplied to a clock changing circuit (variable clock circuit) 3 where the frequency of the clock signal is multipled by a factor of M (M=0 to 1) in response to a magnification factor control signal A to produce a write clock signal which is used to write the image data into a memory 4.

The written image data is read from the memory 4 in synchronism with a clock signal having a frequency $F_R$ which is generated by the clock generator 5. In the circuit shown in FIG. 1, the image data is written into the memory 4 by the write clock having a frequency higher than $f\omega$, that is, the frequency $M2f\omega$ ($0.5 \leq M \leq 1$) to magnify the image so that the image data is interpolated.

On the other hand, to reduce the image, the image data is written into the memory 4 by the write clock having the frequency $M2f\omega$ ($0 \leq M < 0.5$) which is lower than the frequency $f\omega$ so that the image data is interlaced. When the frequency of the write clock is equal to $f\omega$, the image data of the equal scale is produced.

In the image processing apparatus which uses the magnification/reduction system shown in FIG. 1, the clock signal having the frequency $2f\omega$ is necessary to magnify the image by the factor of two. Accordingly, the variable clock circuit 3 (for example, Texas Instrument rate multiplier 7497) and the memory 4 (for example, Intel 2147 high speed static RAM) must be able to operate in a high frequency region and a problem may arise in a stable operation of the circuit.

When $f\omega$ is 10 MHz and a magnification factor of ten is required, the variable clock circuit 3 and the memory 4 must be operated by the write clock signal having a frequency of as high as $10f\omega = 100$ MHz. This is difficult to attain.

Further, since the data is interpolated in the magnification mode, the memory needs a capacity equal to the image data multiplied by the magnification factor ($>1$) in order to magnify the image data. Accordingly, if the number of one line of image data is 4096 bits, the memory 4 needs the capacity equal to $4096 \times 2 = 8192$ its per line in order to magnify the image data by the factor of two in a main scan direction. When the Intel RAM 2147 is used, two such RAM's are required. This increases the cost.

SUMMARY OF THE INVENTION

It is an object of the present invention to eliminate such drawbacks as above-mentioned.

It is another object of the present invention to provide an inexpensive image processing apparatus having a magnification/reduction function.

It is another object of the present invention to provide an image processing apparatus which operates in a stable manner.

It is another object of the present invention to provide an image processing apparatus of simple construction having a magnification/reduction function.

It is another object of the present invention to provide an image processing apparatus having a magnification/reduction function which is simple in construction yet operates in a stable manner.

It is a further object of the present invention to provide an image processing apparatus capable of magnifying or reducing an image with a relatively small capacity memory.

Other objects of the present invention will be apparent from the following description made in conjunction with the accompanying drawings, and the appended claims.

BRIEF DESCRIPTION OF THE DRAWINGS

FIG. 3 shows a sectional view of a readerprinter.

DESCRIPTION OF THE PREFERRED EMBODIMENTS

Figure 2:
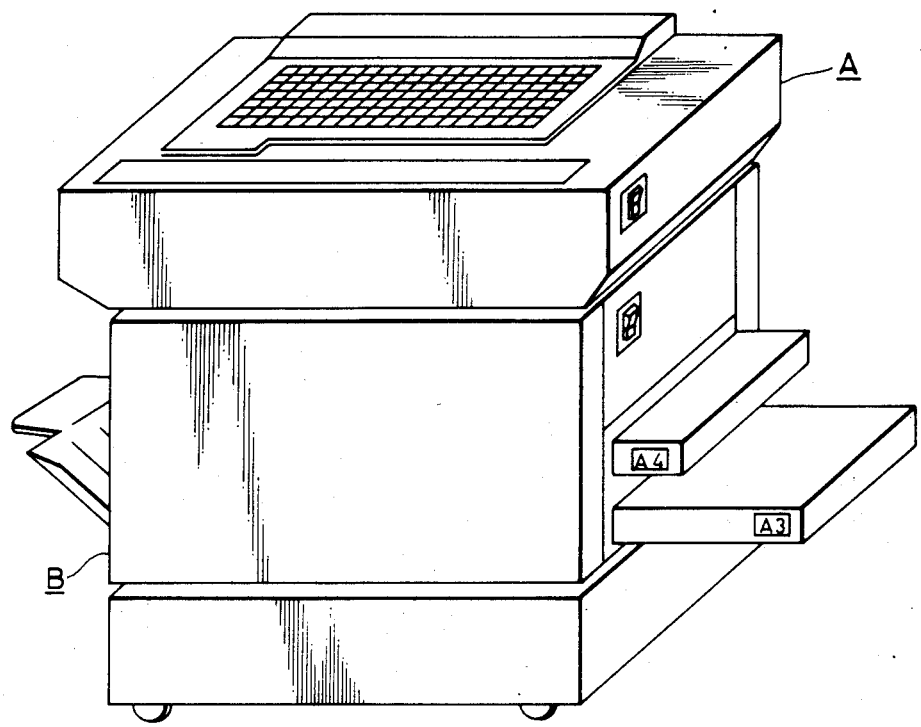
FIG. 2 shows an external view of a copying machine to which the present invention is applicable.

FIG. 2 shows an external view of a copying machine to which the present invention is applicable. It comprises two basic units, a reader A and a printer B. The reader and the printer are mechanically and functionally separated so that they can be separately and individually used. They are connected through electrical cables. The reader B includes a control panel by which a magnification/reduction factor and the number of copies are selected.

FIG. 3 shows a sectional view of the reader A and the printer B. An original sheet is placed in a face-down attitude on an original sheet glass 33. A reference mount position is at the left inside as viewed from a front. The original sheet is pressed to the glass 33 by an original sheet cover 34. The original sheet is illuminated by a fluorescent lamp 32 and a light reflected thereby is focused on a plane of a CCD 31 through mirrors 35 and 37 and a lens 36. The mirrors 37 and 35 are moved at relative velocities of two to one. An optical unit comprising the light source 32 and the mirrors 35 and 37 is moved from left to right at a constant velocity through a PLL by a DC servo motor to sub-scan the original sheet.

A main scan direction is orthogonal to the sub-scan direction. In the present apparatus, the original sheet is electrically main-scanned by a CCD array sensor.

The printer B located below the reader A in FIG. 3 is now explained. A bit-serial image signal processed in the reader is transmitted to the printer in synchronism with an output clock and supplied to a laser scan optical unit 25 which comprises a laser driver, a semiconductor laser, a collimater lens, a rotating polygonal mirror, an F-θ lens, a correction optical system and so on. The image signal is supplied to the laser driver of the laser scan optical unit 25. The laser driver drives the semiconductor laser in accordance with the image signal to generate a light which is modulated by "0" and "1" image signals. The modulated light is directed to the rotating polygonal mirror in the laser scan optical system 25 so that the main scan is effected as the mirror rotates. The scan output light is directed to a reflection mirror 24 through the F-θ lens and the correction optical system of the laser scan optical unit 25 so that the light is irradiated to a specified position on a photosensitive drum 8 by the reflection mirror 24 to mainscan in the photosensitive plane.

The photosensitive drum 8 is rotated in a direction of an arrow at a constant speed so that an image is formed on the photosensitive plane in the sub-scan direction.

The photosensitive drum 8 may comprise three layers, namely a conductive layer, a photosensitive layer and an insulative layer. Process components for forming an image are arranged about the drum 8. Numeral 9 denotes a pre-discharger, numeral 10 denotes a pre-exposure lamp, numeral 11 denotes a primary charger, numeral 12 denotes a secondary charger, numeral 13 denotes a flat exposure lamp, numeral 14 denotes a developing unit, numeral 15 denotes a paper cassette, numeral 16 denotes a paper feed roller, numeral 17 denotes a paper feed guide, numeral 18 denotes a registration roller, numeral 19 denotes a transfer charger, numeral 20 denotes a separation roller, numeral 21 denotes a convey guide, numeral 22 denotes a fixing unit and numeral 23 denotes a tray.

The positions irradiated by the beam bear the "black" pixel information and they are latently imaged by the high voltage chargers 9, 11, and 12 arranged around the photosensitive drum 8 and visualized by toners of the developing unit 14.

When the copy papers have been loaded in the paper cassette 15, the copy paper is fed by the paper registration roller 16 to the vicinity of the photosensitive drum 8 through the paper guide plate 17, and the copy paper passes under the photosensitive drum 8 as the registration roller 18 is operated. The image visualized by the toner is transferred to the copy paper by a transfer high voltage applied by the transfer charger 19, and the copy paper having the toner image transferred thereto is fed to the convey guide 21 through the separation roller 20. Thus, the image signal from the original sheet is transferred to the copy paper. Since the toner is merely deposited on the copy paper at this stage, the copy paper is fed from the convey guide 21 to the fixing unit 22 where the toner image is fixed by a high temperature and a high voltage to form a permanent image. Then, the copy paper is ejected to the tray 23.

Figure 4:
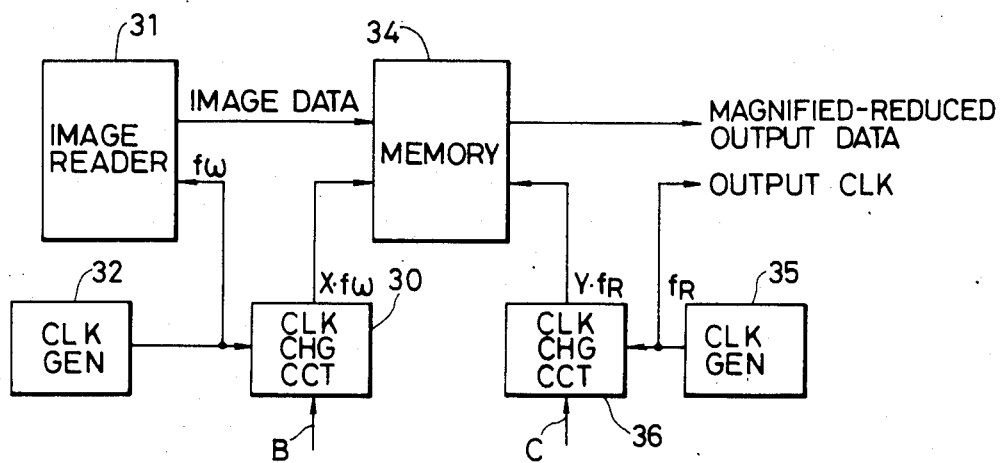
FIG. 4 shows an image processing apparatus in accordance with one embodiment of the present invention.

FIG. 4 shows an embodiment of the image processing apparatus of the present invention, which may be included in the reader A. In FIG. 4, an image reader 31, a clock generator 32, a memory 34 and a clock generator 35 correspond to the image reader 1, the clock generator 2, the memory 4 and the clock generator 5, respectively, of FIG. 1, and the image reader 31 includes a CCD.

Figure 1:
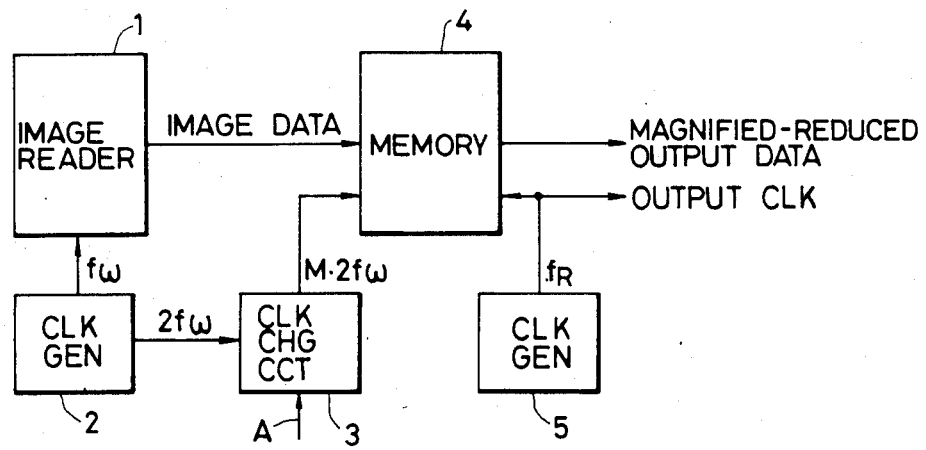
FIG. 1 shows a prior art image processing apparatus having a magnification/reduction function.

Differences between FIG. 4 and FIG. 1 reside in that an output of the clock generator 35 is only a clock signal having the frequency $f_\omega$ and the variable clock circuit 3 of FIG. 1 is divided into a variable clock circuit 30 and a variable clock circuit 36.

The variable clock circuit 30 varies the frequency $f_\omega$ by a factor of X ($0 \leq X \leq 1$) in response to the magnification/reduction control signal B and the variable clock circuit 36 varies the frequency $f_R$ by a factor of Y ($0 \leq Y \leq 1$) in response to the magnification/reduction control signal C. When X=1 and Y=1, an image of the equal scale is produced. Since the highest frequencies of the clock signals produced by the variable clock circuits 30 and 36 and $f_\omega$ and $f_R$, respectively, a stable circuit operation is assured.

When the image is to be reduced, the factor Y is set to unity and only the factor X is varied. That is, the sampling frequency $Xf_\omega$ of the image data is set to be lower than the image data transfer clock frequency $f_\omega$ to interlace the image data to reduce the image. Since the interlaced image data is written into the memory 34, it is read out by the clock signal having the frequency $f_R$ so that the image is reduced by the factor of X.

When the image is to be magnified, the factor X is set to unity and only the factor Y is varied. the image data is read from the memory 34 in synchronism with the clock signal having the frequency $Yf_R$ and it is sampled by the output clock having the frequency $f_R$ so that the image data is interpolated. As a result, the image data is magnified. A magnification factor is equal to 1/Y.

In the above magnification mode and reduction mode, either one of the factors X and Y is fixed to unity and the other is varied for the sake of simplification of the explanation, although both factors X and Y may be concurrently varied. In the latter case, a magnification factor is given by X/Y.

In the present embodiment, the transfer clock frequency $f_\omega$ and the read clock frequency $f_R$ are different because the transfer speed of the input image data from the CCD and the scan speed in the main scan direction of the printer are different. If the transfer speed of the input image data and the scan speed of the printer are the same, the same clock frequency may be used.

The magnification/reduction in the sub-scan direction will be explained below. In the present embodiment, since the rotating speed of the photosensitive drum 8 of the printer B is constant, the magnification/reduction in the sub-scan direction is readily attained by switching the scan speed in the sub-scan direction of the optical unit of the reader A. By reducing the scan speed of the optical unit, the reproduced image is magnified in the sub-scan direction, and by increasing the scan speed of the optical unit, the reproduced image is reduced in the sub-scan direction. By independently setting the magnification/reduction factor in the main scan direction and the magnification/reduction factor in the sub-scan direction, the longitudinal size and the lateral size of the original image can be independently magnified or reduced.

The control signals B and C may be produced by a microcomputer in accordance with a specified magnification/reduction factor, or they may be produced by a switch linked to a magnification/reduction specifying lever or key. The control signals Band C may be determined by an original sheet size and/or a copy paper size.

The memory 34 may be a page memory, or may have two lines of capacity in the main scan direction if the apparatus processes the image on a real time basis.

Figure 5:
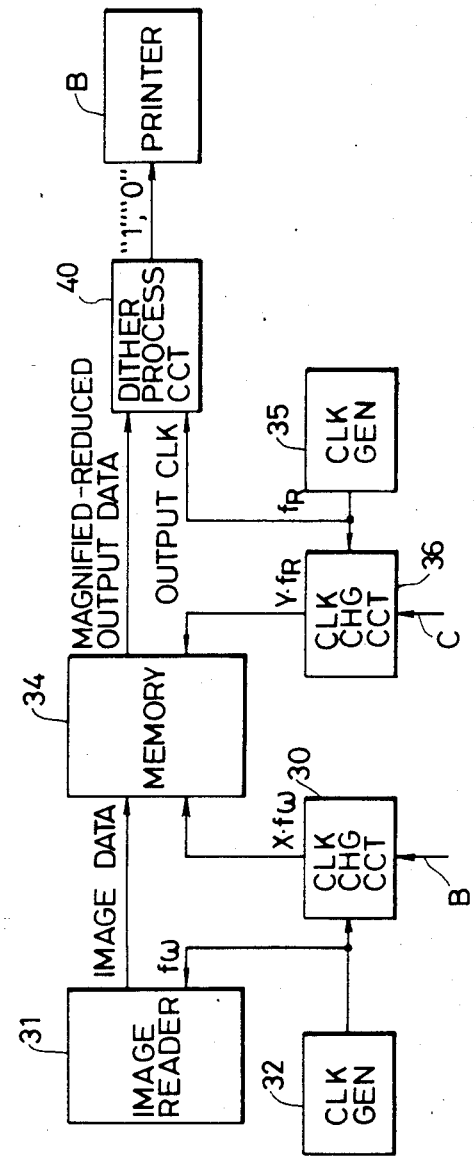
FIG. 5 shows an image processing apparatus having a dither processing circuit.

By processing the magnified or reduced image data to dither-process by a dither processing circuit 40 as shown in FIG. 5, the image can be magnified or reduced without destroying the dither pattern. In this case, the output clock is a timing signal for the dither processing. The "1" and "0" image data after the dither processing are supplied to the printer.

The input image data need not be the data from the reader but it may be image data transmitted from an electronic file, a facsimile or the like.

As described hereinabove, according to the present invention, the image can be magnified with a simple configuration without using a high frequency clock signal.

Since the image data is magnified when it is read from the memory, the capacity of the memory may be small.

Since the magnification factor is given by 1/Y when X=1, the limitation of the operating clock is not imposed and the magnification in a wide range can be attained.

The present invention provides an inexpensive image processing apparatus having the magnification/reduction function.

The present invention is not limited to the illustrated embodiment but many modifications and variations can be made within the scope of the claims.

What is claimed is:

1. An image processing apparatus comprising:
   image data output means;
   memory means for storing the image data output from said image data output means;
   read clock signal generating means for generating a read clock signal to read out the image data stored in said memory means, said read clock signal generating means reducing a frequency of the read clock signal in accordance with a magnification factor to achieve image enlargement;
   output clock signal generating means for generating an output clock signal to sample the image data read from said memory means; and
   write clock signal generating means for generating a write clock signal to write the image data output from said image data output means into said memory means, said write clock signal generating means varying a frequency of the write clock signal in accordance with the magnification factor;
   wherein the frequency of said read clock signal is equal to, in equal size reproduction, or lower than the frequency of said output clock signal.

2. An image processing apparatus according to claim 1, wherein said write clock signal generating means reduces the frequency of the write clock signal in accordance with the magnification factor to achieve image reduction.

3. An image processing apparatus according to claim 2, wherein said image data output means outputs the image data to said memory means in accordance with a transfer clock signal having a constant frequency, the frequency of the write clock signal being equal to or lower than the frequency of the transfer clock signal.

4. An image processing apparatus according to claim 1, further comprising half-tone processing means for half-tone processing the sampled image data.

5. An image processing apparatus according to claim 4 further comprising recording means for recording the half-tone processed image data.

6. An image processing apparatus according to claim 4, wherein said half-tone processing means includes dither conversion means for dither conversion of the sampled image data.

7. An image processing apparatus comprising:
   image data output means;
   memory means for storing the image data output from said image data output means;
   write clock signal generating means for generating a write clock signal to write the image data output from said image data output means into said memory means, said write clock signal generating means varying the frequency of the write clock signal in accordance with a magnification factor;
   read clock signal generating means for generating a read clock signal to read out the image data from said memory means, said read clock signal generating means reducing a frequency of the read clock signal in accordance with the magnification factor to achieve image enlargement; and
   output clock signal generating means for generating an output clock signal to sample the image data read from said memory means, the frequency of the read clock signal being equal to or lower than the frequency of the output clock;
   wherein said image data output means outputs the image data to said memory means in accordance with a transfer clock signal, and the frequency of the transfer clocks signal is equal to that of the write clock signal when an image of real size is to be reproduced.

8. An image processing apparatus according to claim 7, wherein the frequency of the transfer clock signal is constant, and the frequency of the write clock signal being equal to or lower than the frequency of the transfer clock signal.

9. An image processing apparatus according to claim 8 wherein said write clock signal generating means reduces the frequency of the write clock signal in accordance with the magnification factor to achieve image reduction.

10. An image processing apparatus according to claim 9, wherein the frequency of the read clock signal is equal to the frequency of the output clock signal when achieving image reduction.

11. An image processing apparatus according to claim 7, further comprising half-tone processing means for half tone processing the sampled image data.

12. An image processing apparatus according to claim 7, wherein the frequency of the write clock signal is equal to the frequency of the transfer clock signal when achieving image enlargement.

13. An image processing apparatus comprising:
   image data output means;
   memory means for storing the image data output from said image data output means;
   write clock signal generating means for generating a write clock signal to write the image data output from said image data output means into said memory means, said write clock signal generating means reducing a frequency of the write clock signal in accordance with a mangification factor to achieve image reduction; and
   transfer clock signal generating means for generating a transfer clock signal;
   said image data output means outputting the image data to said memory in accordance with the transfer clock signal, and the frequency of the write clock signal being equal to, for equal size reproduction, or lower than the frequency of the transfer clock signal; and read clock signal generating means for generating a read clock signal to read out the image data stored in said memory means, said read clock signal generating means varying a frequency of the read clock signal in accordance with the magnification factor.

14. An image processing apparatus according to claim 13, wherein said read clock signal generating means reducing a frequency of the read clock signal in accordance with the magnification factor to achieve image enlargement; said apparatus further comprising output clock signal generating means for generating an output clock signal to sample the image data read from said memory means, the frequency of said read clock signal being equal to or lower than the frequency of said output clock signal.

15. An image processing apparatus according to claim 14, wherein the frequency of the read clock signal is equal to the frequency of the output clock signal when achieving image reduction.

16. An image processing apparatus according to claim 14, wherein the frequency of the write clock signal is equal to the frequency of the transfer clock signal when achieving image enlargement.

17. An image processing apparatus according to claim 14 further comprising half-tone processing means for half-tone processing the sampled image data.

18. An image processing apparatus comprising:
means for producing image data;
memory means for storing the image data;
transfer clock signal generating means for generating a transfer clock signal having a constant frequency, the image data being transferable from the producing means to said memory means at a rate in accordance with the transfer clock signal;
write clock signal generating means for generating a write clock signal, tha image data being writable into said memory means at a rate in accordance with the write clock signal;
read clock signal generating means for generating a read clock signal, the image data stored in said memory means being readable from the memory means at a rate in accordance with the read clock signal; and output clock signal generating means for generating an output clock signal, the image data read from said memory means being samplable at a rate in accordance with the output clock signal;
wherein said write clock signal generating means is operable to reduce the frequency of the write clock signal in accordance with a magnification factor to achieve image reduction, the ratio of the frequency of the read clock signal to the frequency of the output clock signal being constant when achieving image reduction, and said read clock signal generating means is operable to reduce the frequency of the read clock signal in accordance with the magnification factor to achieve image enlargement.

19. An apparatus according to claim 18, wherein the frequency of the write clock signal is equal to or lower than the frequency of the transfer clock signal.

20. An apparatus according to claim 19, wherein the frequency of the read clock signal is always equal to the frequency of the output clock signal when achieving image reduction.

21. An apparatus according to claim 19, wherein the frequency of the read clock signal is equal to or lower than the frequency of said output clock signal.

22. An apparatus according to claim 21, wherein a ratio of the frequency of the write clock signal to the frequency of the transfer clock signal is constant when achieving image enlargement.

23. An apparatus according to claim 22, wherein the frequency of the write clock signal is always equal to the frequency of the transfer clock signal when achieving image enlargement.

24. An apparatus according to claim 21, wherein the frequency of the output clock signal is constant.

25. An apparatus according to claim 19, further comprising halftone processing means for halftone processing the sampled image data.

26. An apparatus according to claim 25, further comprising recording means for recording the halftone processed image data.

27. An apparatus according to claim 19, wherein the frequency of the write clock signal, the frequency of the transfer clock signal, the frequency of the read clock signal and the frequency of the output clock signal are equal when achieving real-size image formation.

* * * * *

UNITED STATES PATENT AND TRADEMARK OFFICE
CERTIFICATE OF CORRECTION

PATENT NO. : 4,679,096

DATED : July 7, 1987

INVENTOR(S) : NAO NAGASHIMA

It is certified that error appears in the above-identified patent and that said Letters Patent is hereby corrected as shown below:

COLUMN 1

Line 15, Delete "an".
    Line 15, "from image" should read --from an image--.
    Line 30, "$F_R$" should read --$f_R$--.
    Line 64, "its" should read --bits--.

COLUMN 2

Line 22, "be" should read --become--.
    Line 32, "readerprinter," should read --reader-printer,--.

COLUMN 3

Line 17, "mainscan" should read --main-scan--.
    Line 43, "registra-" should read --feed--.
    Line 44, Delete "tion".

UNITED STATES PATENT AND TRADEMARK OFFICE
CERTIFICATE OF CORRECTION

PATENT NO. : 4,679,096            Page 2 of 3

DATED : July 7, 1987

INVENTOR(S) : NAO NAGASHIMA

It is certified that error appears in the above-identified patent and that said Letters Patent is hereby corrected as shown below:

COLUMN 4

Line 23, "varied. the" should read --varied.  The--.
    Line 63, "Band" should read --B and--.
    Line 68, "real time" should read --real-time--.

COLUMN 5

Line 18, Close up right margin.
    Line 19, Close up left margin.
    Line 62, "half-tone" should read --halftone--.
    Line 65, "4 further" should read --4, further--.
    Line 66, "half-tone" should read --halftone--.
    Line 68, "half-tone" should read --halftone--.

COLUMN 6

Line 27, "clocks" should read --clock--.
    Line 36, "8 wherein" should read --8, wherein--.
    Line 46, "half-tone" should read --halftone--.
    Line 47, "half tone" should read --halftone--.
    Line 66, "memory in" should read --memory means in--.

UNITED STATES PATENT AND TRADEMARK OFFICE
CERTIFICATE OF CORRECTION

PATENT NO. : 4,679,096　　　　　　　Page 3 of 3
DATED : July 7, 1987
INVENTOR(S) : NAO NAGASHIMA It is certified that error appears in the above-identified patent and that said Letters Patent is hereby corrected as shown below:

COLUMN 7

Line 11, "reducing" should read --reduces--.
    Line 28, "14 further" should read --14, further --; and "half-tone" should read --halftone--.
    Line 39, "tha" should read --the--.

COLUMN 8

Line 39, "halftone pro-' should read --halftone-pro--.

Signed and Sealed this

Fifteenth Day of March, 1988

Attest:

DONALD J. QUIGG

Attesting Officer　　　　　Commissioner of Patents and Trademarks